US009959671B1

(12) United States Patent
Carriere, IV et al.

(10) Patent No.: US 9,959,671 B1
(45) Date of Patent: May 1, 2018

(54) SYSTEM AND METHOD FOR CAPTURING, PROCESSING AND RENDERING DATA THROUGH A TEMPLATE-DRIVEN PROCESSING PIPELINE

(71) Applicants: Charles Paul Carriere, IV, New Orleans, LA (US); Kaben Gabriel Nanlohy, Longmont, CO (US); Harold Cole Wiley, New Orleans, LA (US)

(72) Inventors: Charles Paul Carriere, IV, New Orleans, LA (US); Kaben Gabriel Nanlohy, Longmont, CO (US); Harold Cole Wiley, New Orleans, LA (US)

(73) Assignee: Scandy, LLC, Elmwood, LA (US)

( * ) Notice: Subject to any disclaimer, the term of this patent is extended or adjusted under 35 U.S.C. 154(b) by 0 days. days.

(21) Appl. No.: 15/874,666

(22) Filed: Jan. 18, 2018

(51) Int. Cl.
*G06T 17/00* (2006.01)
*G06T 17/20* (2006.01)
*G06T 15/00* (2011.01)
*H04N 13/02* (2006.01)
*G06T 15/04* (2011.01)

(52) U.S. Cl.
CPC ............ *G06T 17/20* (2013.01); *G06T 15/005* (2013.01); *G06T 15/04* (2013.01); *H04N 13/0207* (2013.01); *H04N 13/0257* (2013.01)

(58) Field of Classification Search
CPC ....... G06T 17/20; G06T 15/005; G06T 15/04; H04N 13/207; H04N 13/0257
See application file for complete search history.

(56) References Cited

U.S. PATENT DOCUMENTS

| 8,976,172 | B2 | 3/2015 | Jones |
| 9,438,886 | B2 | 9/2016 | Mayhew et al. |
| 9,589,177 | B2 | 3/2017 | Shor et al. |
| 2013/0321401 | A1* | 12/2013 | Piemonte ........... G01C 21/3635 345/419 |
| 2016/0110917 | A1 | 4/2016 | Iverson et al. |
| 2017/0280129 | A1* | 9/2017 | Mirota ............... H04N 13/0203 |

* cited by examiner

*Primary Examiner* — Robert Craddock
(74) *Attorney, Agent, or Firm* — Cara Stone, LLP; Adam V. Vickers

(57) ABSTRACT

A system and method are provided which generate a three-dimensional model of a subject from continuous capture of images or video on a hand-held portable device, such as the typical consumer "smartphone." The system may comprise a depth sensor, an integrated digital camera, an inertial measurement unit, and a template-driven data processing pipeline. The pipeline receives and processes depth, color and inertial measurement data to produce a real-time three-dimensional rendering of the subject. The system may also allow for coordination of multiple connected devices such that processing functions may be allocated to different devices. A user may save the rendering in a variety of different formats and transmit it to multiple devices via any conventional means available. The system is thread-safe to prevent crashes. It is also platform-agnostic and may operate on a variety of hardware and software platforms on different types and brands of devices without re-programming.

16 Claims, 7 Drawing Sheets

*Worker and Channel Configuration Chart*

| Worker | Modules | Ring Buffers | Channel Connections |
|---|---|---|---|
| Depth Frame Input Worker (300) | . Depth Frame Input Module (301) | None | Depth Frame Input Channel (400) |
| SLAM Worker (500) | . Image Processing Module (501)<br>. Tracking Module (502)<br>. Integrate Module (503)<br>. Raycast Module (504)<br>. Render Module (505)<br>. Render Output Module (506) | . Image Pyramid Ring Buffer (B2)<br>. Tracking Store Ring Buffer (B3)<br>. TSDF Volume Ring Buffer (B4)<br>. RGBA Preview Image Ring Buffer (B5) | Depth Frame Input Channel (400) |
| Color Frame Input Worker (900) | . Color Frame Module (901) | None | Color Frame Input Channel (1000) |
| IMU Frame Input Worker (600) | . IMU Frame Module (601) | None | IMU Frame Input Channel (700) |
| Color Integration Worker (1100) | . Integrate Color Module (1101) | . Tracking Store Ring Buffer (B3)<br>. TSDF Volume Ring Buffer (B4)<br>. Color TSDF Ring Buffer (B7) | Color Frame Input Channel (1000) |
| IMU Tracking Worker (800) | . IMU Tracking Module (Kalman filter) (801) | . Tracking Store Ring Buffer (B3) | IMU Frame Input Channel (700) |
| Mesh Output Worker (1200) | . Mesh Module (1201)<br>. Save Mesh Module (1202) | . Mesh Ring Buffer (B9)<br>. TSDF Volume Ring Buffer (B4)<br>. Color TSDF Ring Buffer (B7) | None |

| Channel | Workers than enqueue | Workers than dequeue | ring buffer |
|---|---|---|---|
| Depth Frame Input Channel (400) | Depth Frame Input Worker (300) | SLAM Worker (500) | . Depth Frame Ring Buffer (B1) |
| Color Frame Input Channel (1000) | Color Frame Input Worker (900) | Color Integration Worker (1100) | . Color Image Ring Buffer (B6) |
| IMU Frame Input Channel (700) | IMU Frame Input Worker (600) | IMU Tracking Worker (800) | . IMU Input Channel Ring Buffer (B8) |

*FIG. 6*

SYSTEM AND METHOD FOR CAPTURING, PROCESSING AND RENDERING DATA THROUGH A TEMPLATE-DRIVEN PROCESSING PIPELINE

FIELD OF THE INVENTION

The present invention relates to coordinating real-time capture, processing, and rendering of image data through a template-driven pipeline which facilitates deployment of the data to a multitude of devices through a single build. In a preferred embodiment, the present invention relates to real-time generation of a three-dimensional ("3D") model from continuous capture of 3D images on a hand-held portable device without predetermined hardware, such as the typical off-the-shelf consumer-oriented "smartphone."

BACKGROUND OF THE INVENTION

The ability to generate, capture, process, and render data on computers, namely portable phones, has evolved with the advancement of silicon chip manufacturing. The ability to generate a 3D model of an object from a series of 3D images has evolved with the advancement of image capture technology and related data processing. Detailed 3D models are used in a variety of applications, such as human modeling, augmented reality, virtual reality, spatial modeling, portable mapping and video games. The models are usually created with image frame data obtained from an image capture device, such as a digital camera or a depth sensor.

Those skilled in the art have developed multi-view photogrammetric structure from motion ("SFM") 3D reconstruction methods which use video image data, more fundamentally a series of still photos, to estimate 3D geometry of a landscape or a space. In general, the method matches corresponding points between each successive 2D image and records the relative positions of the image recording device. This process is also known as photogrammetry.

Multiple successive images taken using SFM, stereo-vision, time-of-flight ("ToF") depth sensors, structured light depth sensors, light detection and ranging ("LIDAR") or any other depth-sensing technologies may be used to create a disparity map or an approximated 3D point cloud. Points within the 3D point cloud are connected to create a surface structure commonly known as a 3D mesh. Various methods are known to extrapolate a 3D model of the target subject from the 3D mesh, some applying a texture based on high-resolution image data.

The 3D mesh generation process typically uses one or more methods to incorporate the image capture device's location and orientation to improve point cloud accuracy. The process may also incorporate standard color camera data which are then projected onto the final 3D model.

Various software applications may be employed to perform 3D reconstruction by standard 2D color image analysis, such as Acute3D, Agisoft Photoscan, Autodesk 123D Catch, Sketchup, and VisualSFM (registered trademarks). Reconstruction of a 3D mesh from images may also be achieved by RGBA-Depth analysis using software applications such as ReconstructMe, Occipital's Skanect and Structure SDK, Geomagic, Artec Studio, Microsoft's SDK for Kinect, or Microsoft's MobileFusion (registered trademarks).

Hardware and software designed to reconstruct 3D models has become significantly more sophisticated over the last couple of decades. The hardware required to capture the data and process it with 3D reconstruction software has become more compact and portable. Likewise, software applications for processing and rendering 3D models have become more efficient and effective at producing very detailed and realistic 3D models. The hardware in most flagship smartphones is powerful enough to run the sophisticated 3D reconstruction software, but the typical native software often crashes due to incompatibility with diverse hardware configurations.

Moreover, the brand-specific hardware used in many consumer-based computing products typically requires a specific software platform which is not compatible with other consumer brands' hardware. Therefore, a software advancement such as Microsoft's Kinect Fusion™ may not operate on a different brand's device without adapting its code. Such brand-specific development limits a consumer's ability to enjoy many technological advancements.

The general approach to processing 3D image-related data employs sequential processing logic, and is coupled to a specific hardware configuration. Data is acquired from one or multiple different sensors and input into certain algorithm computing modules ("modules"). Each module sequentially processes a different type of data, such as depth map data, tracking data or color image data, at different stages of the 3D reconstruction process. The device may employ a Central Processing Unit ("CPU"), a Graphics Processing Unit ("GPU"), an Application Specific Integrated Circuit ("ASIC"), a Digital Signal Processor ("DSP"), Field-Programmable Gate Array ("FPGA"), or a combination to compose a final 3D mesh. Standard CPUs in typical smartphones and tablets are too slow to process data in real-time without reducing resolution and/or speed of reconstruction. Consequently, current 3D reconstruction software applications that primarily employ CPUs often cause a standard, consumer-oriented portable computing device to "crash" due to a system timeout. In the alternative, the software might not run at all because the software requires more memory or higher processor speed than is available. In such cases the data must be uploaded to a render server, which the average consumer may not be able to access or know how to operate.

There is a need to be able to record and process continuous, real-time depth image and/or video capture data on the average hand-held portable device, and simultaneously generate a 3D model on the device without the aid of ancillary or external processing devices. A "ring buffer" data structure and "thread-safe processing pipeline" approach has been developed to fulfill this need and is disclosed in one embodiment of the invention. Under this approach, the modules within the 3D reconstruction system have been decoupled and ring buffers have been inserted. Each module may enqueue data into a connected ring buffer without sending the data directly to another module. Data may be temporarily stored in the corresponding ring buffer until one of the modules dequeues the data for use in processing a subsequent or corresponding portion of the 3D model. A multitude of algorithms are commonly known in the art for enqueueing and dequeuing data to and from ring buffers, and no specific algorithm is required for the invention to operate as intended.

The system may process a large amount of data in multiple threads without crashing. If a module becomes "blocked" (i.e., "backed-up" or "starved" of data), other modules may continue to receive, process, and enqueue data to buffers. The ability to run modules in separate threads permits continuous data processing, which will allow a "blocked" module to resume processing and prevent a crash.

Furthermore, the system may run 3D reconstruction software on a diverse suite of devices without re-compiling the software due to its versatile data structures, processing pipeline, and module implementations. Software developers may employ the invention to implement their algorithms across a diverse range of different hardware and software platforms, which will promote broader access to cutting-edge software developments.

SUMMARY

The following embodiments thereof are described and illustrated in conjunction with systems, machines, and methods which are meant to be exemplary and illustrative, and not limiting in scope. In various embodiments, one or more of the above-described problems have been reduced or eliminated, while other embodiments are directed to other improvements.

A preferred embodiment of the invention includes a method, system, and computer program for processing real-time image capture data on a hand-held portable computing device and producing a real-time 3D model of the target subject on the display screen. According to one embodiment, a method performed by a hand-held portable computing device may include capturing multiple images or continuous video of a target subject using a depth sensor or a typical integrated digital camera. The images or video may include integrated depth data which the portable computing device may process and enqueue to a ring buffer data structure, which has not been developed for a template-driven processing pipeline on an average consumer portable computing device. The data may be processed through a series of modules which are separated by a series of ring buffers. Separating the modules with ring buffers "insulates" each module so that it can finish processing newly received data without interruption. As a result, multiple modules may process data simultaneously on multiple threads if the run-time system's hardware supports parallelism. This allows controlled degradation of data processing, without crashing the system, to support various models of concurrency or sequential processing.

According to another embodiment, a method performed by a hand-held portable computing device may include measuring and recording positional and angular motion using an inertial measurement unit ("IMU") electronic device, which may include a combination of accelerometer(s), gyroscope(s), compass(es), and/or magnetometer(s). The IMU data may be processed through a series of modules and ring buffers, and then integrated with the corresponding image and depth data via the system pipeline.

According to another embodiment, a method performed by a hand-held portable computing device may include recording color image data corresponding to the image and depth frame data and the IMU data. The color image data may be processed through a series of modules and ring buffers, and then integrated with the corresponding image and depth data and the IMU data via the system pipeline.

The portable computing device may continue capturing image, depth, IMU and color data of the target subject as the user rotates the device around the target subject. The system provides the portable computing device with a means to run multiple data processing threads simultaneously to perform real-time 3D model reconstruction of the target object as the portable computing device continuously records data. Despite processing power limitations of a typical hand-held portable computing device, the system will significantly decrease system crashes given the versatility of the real-time capture, processing, and rendering template-driven pipeline.

The final mesh output is a detailed 3D reconstruction of the target subject on the portable computing device screen.

According to another embodiment, the portable computing device may collaborate and "partner" with other devices vis-à-vis a hard-wired or a wireless network. In such case, the "master" portable computing device may allocate certain processing tasks to the partnered devices depending on the hardware and processing capacities available on the devices. As a result, the 3D model may be generated based on data acquired and processed by the master portable computing device and the partnered devices.

According to another embodiment, the system and method may interface with all known operating software platforms which off-the-shelf portable computing devices typically use, for example RenderScript on Android™ devices, Metal on iPhone™ devices, CUDA on NVIDIA™ devices, OpenCL on Intel™ devices.

BRIEF DESCRIPTION OF THE DRAWINGS

FIG. 6 is a table which shows a pipeline configuration of the invention with its different processing workers, their components and their channel connections as disclosed in the preferred embodiment.

DETAILED DESCRIPTION

Figure 1:
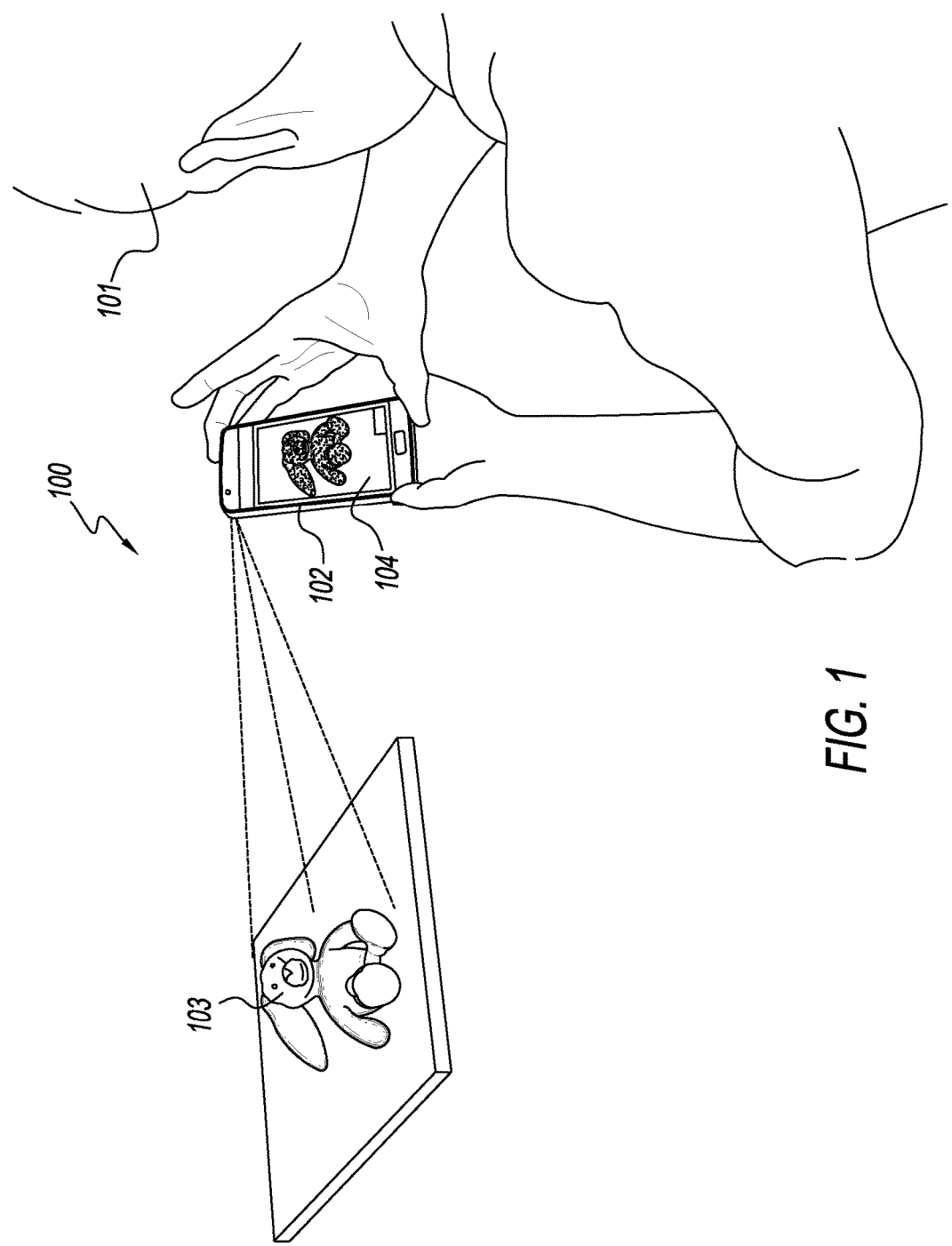
FIG. 1 shows a person scanning a target object using a portable computing device.

References are made to particular features, including methods and steps of the invention, in the Summary above, this Detailed Description, the claims below, and in the accompanying drawings. It is to be understood that the disclosure of the invention in this specification includes all possible combinations of such particular features. For example, where a particular feature is disclosed in the context of a particular aspect or embodiment of the invention, or a particular claim, that feature may also be used, to the extent possible, in combination with or in the context of other particular aspects or embodiments of the invention, and in the invention generally.

The term "comprises" and grammatical equivalents thereof are used to mean that other components, steps, etc., are optionally present. For example, a system "comprising" components or steps A, B, and C may contain only components or steps A, B, and C, or may contain not only components or steps A, B, and C, but also one or more other components or steps.

Where reference is made to a system or method comprising two or more defined steps, the defined steps may be carried out in any order or simultaneously (except where the context excludes that possibility), and the system or method may include one or more other steps which may be carried out before any of the defined steps, between two of the defined steps, or after all the defined steps (except where the context excludes that possibility).

Advancement of portable computing devices has caused the average consumer to integrate them into daily life, in a large part due to the convenience of creating, storing and transmitting photos, videos, and other types of data. With increasing sophistication of 3D scanning and modeling, consumers have expressed significant interest in creating, manipulating and integrating real-time 3D models of daily objects into a variety of applications. However, off-the-shelf portable computing devices remain far less powerful than bulkier, less-portable devices such as desktop computers, laptops and even tablets. Regardless of the application, it is desired to create a system capable of running on a single portable phone or on a combination of high-power devices (workstations or servers) and a multitude of portable phones without re-designing the software or in best-case circumstances re-compiling the software.

Memory and processing power are typically dynamically allocated by an operating system, particularly when processing real-time data input on multiple instruction code sequences, commonly in the industry and herein referred to as "threads." This is a resource-expensive and timely operation. Such dynamic allocation can fragment processing power and memory, which can exhaust the processing power and memory available. Furthermore, different hardware implementations have different limits, such as the amount of allocable memory, number of threads that may address the GPU, size of primitive data types and feature flags enabled, which may prevent consumer-grade portable computing devices from running particular implementations of sophisticated algorithms. The typical result is the system crashes or produces erroneous results due to a process timing out, allocating more memory than available, writing out-of-bounds of allocated memory, buffer stride issues, or other potential runtime errors, and the device fails to accomplish the desired result of the software.

The system and method disclosed herein acts on a plurality of platforms in a "thread-safe" way. The term "thread-safe" herein refers to simultaneous operation of multiple computing threads, as they are commonly known in the art, without locking another thread out of shared data resources. The proposed system solves this problem by creating a method of obtaining, processing, and then communicating data between multiple threads via a "pipeline" that is configurable at runtime. A "pipeline" is a connected set of data processing components where each component may receive data, process it, and output it to another component. A pipeline has two main components: "channels" and "workers."

A "worker" is a collection of one or more data processors, herein referred to as "modules," and one or more ring buffers. Ring buffers, which are well-known in the art, are data structures used to accept, store and deliver data. A pipeline comprises more than one worker.

A "channel" as disclosed herein is a connection between workers. A channel provides a means to store and communicate data between one or more workers. A channel may and often does incorporate at least one ring buffer within the channel.

Each worker in a pipeline creates and runs on its own thread so that each worker may run independent of other workers. A worker receives data from one or more channels or other data source(s). Each worker then processes data it receives through modules within the worker. After a module processes data, the module may send or enqueue the processed data to one or more ring buffers. Likewise, a module may dequeue data from a ring buffer. A worker may include references to instances, identifications, types, names, or other means of identifying channels to which it may enqueue data and from which it may dequeue data. Workers may send data to other workers through a series of channels.

A worker processes data through its module or modules sequentially, only blocked when the program instructs the worker to await input from various channels. One embodiment encapsulates all the workers modules in a loop that repeats execution as long as the attached pipeline is running. An additional embodiment is to execute the worker exactly once, when the worker is attached to the pipeline and terminate following the single execution.

As many channels and workers as necessary to process a 3D model may be attached to a pipeline. Moreover, an unlimited number of instances of a particular worker may be attached to the pipeline, the number of instances reflecting the "importance" a developer assigns to that channel.

Each channel and ring buffer employs a mutual exclusion object ("mutex") with which a worker can lock the channel or ring buffer for exclusive use to safely enqueue or dequeue data, and then unlock the channel or ring buffer to make it available to other workers attached to the pipeline. Channels and ring buffers are considered "thread-safe" when the mutex locks out other workers because the data is protected from deadlock, allocation/deallocation errors, indexing out-of-bounds, execution timeouts, and other runtime errors.

The process of enqueueing data may be optimized when the ring buffers are pre-allocated, or designed to allocate memory on initialization. The risk of enqueueing more data than the runtime system has available is minimized when the ring buffers are pre-allocated at a certain size based on the hardware constraints. This eliminates the risk of possibly requesting more memory than the system allows, thereby preventing runtime errors.

The proposed system may also create a method for developers to enable multiple computing hardware platforms, such as different GPU platforms or DSP platforms, by implementing multiple platform-specific versions of a worker, which will allow the pipeline to attach the correct version based upon the available runtime hardware. Thus, the system may support multiple hardware platforms. For example, a worker that computes vertex normals may be implemented in C++, OpenCL, Metal, and OpenVX.

In a "template-driven processing pipeline" as disclosed herein, channels are configured and templated for various hardware platforms, meaning that software developers may specify a template parameter that can be set for different hardware so the pipeline may choose the correct templated channel at runtime. Templated channels include one or more template-based ring buffers and a means for notifying workers that data has been processed. There are many methods commonly known to those skilled in the art for notifying workers that changes have occurred. Each worker may enqueue processed data to one or more channels, and each worker may dequeue data from one or more channels when the data is available and the worker needs it.

In a preferred embodiment, the system comprises a pipeline of workers, channels and an attached or integrated digital camera which records RGB data. The pipeline comprises a worker ("camera-worker"). The camera-worker is connected to a channel ("RGB-channel") which contains a ring buffer. RGB-channel connects the camera-worker to a GPU worker ("GPU-worker") which includes a ring buffer ("GPU-buffer") and houses a module with source code for a specific GPU.

When the system executes the pipeline, camera-worker acquires data from the integrated digital camera and enqueues the data to the RGB-channel. The RGB-channel then issues a notify event indicating that it enqueued new data. The GPU-worker receives the notify event, and then it dequeues the data from the RGB-channel. The GPU-worker then prepares the data for the GPU software platform by copying the data from the RGB-channel into the GPU-buffer. The GPU computing module may then execute its algorithm on this data.

After executing the module on the GPU, the GPU-worker may save the modified data in the GPU-buffer to disk. If the GPU-worker has a module for reducing image noise, which is a standard algorithm to those knowledgeable in the art, this pipeline would take an image from a camera sensor, filter the noise, and then save the image. The benefit of using the system and method proposed here is that the developer may implement the GPU-worker for different hardware platforms (OpenCL, OpenVX, CUDA, Metal, etc. . . . ) and deploy the software to multiple devices without having to recompile for each platform.

In the foregoing example, the GPU-worker and the GPU-buffer comprise different templates, each of which may be configured to be compatible with a different hardware platform. When the system executes, the GPU-worker and the GPU-buffer will select the appropriate modules and ring buffers to facilitate operation with the native system's software platform.

Moreover, the system may comprise multiple instances of the GPU-worker to run concurrently, which will enhance throughput. All instances of the GPU-worker may dequeue data from the RGB-channel, process those data, and then enqueue those data to the GPU-buffer without waiting for another GPU-worker to start or finish its function. Furthermore, the RGB-channel may enqueue multiple simultaneous entries to its ring buffer if the runtime hardware supports concurrently running multiple instances of the GPU-worker. Running multiple instances will decrease processing time. Furthermore, the system may assign a certain level of importance or priority to the operations of the GPU-worker by giving it more instances relative to another worker regardless of the specific runtime hardware.

One of the many hurdles encountered with development and implementation of software program architecture is making that architecture hardware/software platform-agnostic. This will allow it to operate on a variety of different hardware/software platforms on different types and brands of computing devices, such as Android™, iPhone™, Samsung Galaxy™, x86_64 Ubuntu Linux™, Windows 10™, macOS™, Dell™, Lenovo™, ASUS™, and HP™.

As an example of current design patterns and their limitations, PCL (PointCloudLibrary) has implemented an open-source version of Kinect Fusion™ called Kinfu. Kinfu has specific hardware requirements of a Windows™ computer, a Microsoft Kinect™, and a CUDA-enabled Nvidia GPU. These hardware constraints would not apply if the implementation of Kinfu in PCL had been performed using the system and method disclosed herein. To allow running on different GPU systems (e.g., CUDA, OpenCL, OpenGL ES, Metal, RenderScript, or Vulkan), the system must merely provide compatible versions of the modules for the supported platforms. The system described herein would detect which GPU system is available and select the appropriate module(s). The following comprises an example of code which will facilitate platform-specific module selection, thereby making the system compatible with multiple platforms:

```
# inside of a KinfuWorker #
gpu_platform=system.get_gpu_platform( )
if not modules.has_key(gpu_platform):
    system.log(error, "There is no module implemented for #{gpu_platform}")
    return
input_frame=DepthChannel.dequeue( )
if input_buffer==None:
    input_buffer=GPU.createRingBuffer<gpu_platform>(input_frame.size( ))
modules [gpu_platform] ["copy_input"](input_frame, input_buffer)
if half_sample_buffers.size( )<image_pyramid_levels:
    half_sample_buffers.clear( )
    for i=1; i<image_pyramid_levels; i++:
        half_sample_buffers.append (GPU.createRingBuffer<gpu_platform>(input_frame.size( )/(4**i)))
    modules[gpu_platform]["half_sample_pyramid"](input_buffer, half_sample_buffers)
```

The challenges to implementing cutting-edge research into consumer-ready software are further illustrated in Microsoft's MobileFusion paper released in August 2015. MobileFusion is a Microsoft-supported research project intended to allow people to create high-quality 3D models in real time with an off-the-shelf portable phone. The initial implementation was on an iPhone 6™. Microsoft demonstrated this technology in the latter part of 2016. However, a means to implement this software on a consumer-ready application which may be run on multiple different types of standard smartphones with different platforms has not been disclosed. The proposed system and method would render the MobileFusion development consumer-ready and fully operational on standard smartphones.

In accordance with one embodiment, namely creating a 3D model in real-time on a portable computing device, the system and method architecture acquires three different general data inputs on workers: a depth frame input worker, an IMU input worker, and a color frame input worker. The architecture allows each worker to enqueue data to a particular channel from the moment the data is received and initially stored, through each processing step such that large sets of data may be processed, tracked, integrated, and rendered into a final 3D model of the target subject. More specifically, this embodiment of the system architecture discloses at least three channels, each designated to receive, store, and transmit a specific data type. This embodiment of the system also discloses at least seven workers, each of which dequeues data from a specific channel or multiple channels, processes those data, and then enqueues those data to another channel where the processed data may be dequeued by a different worker for further processing. The architecture is designed such that the channels store data and provide it to the next worker in a thread-safe fashion, which allows the system to run multiple processing threads without suffering from deadlock, allocation/deallocation errors, indexing out-of-bounds, execution timeouts, and other runtime errors, thereby avoiding system crash when a memory- and processor-intensive program is run on a typical handheld portable computing device, in one embodiment a smartphone.

In a preferred embodiment, a data processing system and method is described including one or more of the following elements: First, a depth frame input channel which includes a depth map ring buffer, and a depth frame input worker. Second, an IMU input channel which includes an IMU data ring buffer, and an IMU frame input worker. Third, a color frame input channel which includes a color image ring buffer and a color frame input worker. Fourth, a simultaneous localization and mapping ("SLAM") worker with a depth image processing module, an image pyramid ring buffer, a depth image tracking module, a tracking store ring buffer, an integration module, a truncated signed distance function ("TSDF") volume ring buffer, a ray casting module, a render module, and an RGBA preview image ring buffer. Fifth, an IMU tracking worker with a tracking module and a reference to the tracking store ring buffer within the SLAM worker. Sixth, a color integration worker with a color integration module also with a reference to the tracking store ring buffer within the SLAM worker, and a color volume ("RGBA TSDF") lookup ring buffer. Seventh, a mesh output worker with a mesh module, a save mesh module, a mesh ring buffer, a reference to the color volume lookup ring buffer within the color integration worker, and a reference to the volume ring buffer within the SLAM worker. A particular implementation is described as well, namely a data structure and algorithms for depth image, IMU, and color frame data acquisition and processing management which integrates the module and buffer scheme disclosed herein.

The modules, workers, and channels may be arranged in coupled or decoupled fashion as the developer desires. For example, the developer may put the module from the depth frame input worker into the SLAM worker, or the developer may break out all the modules in the SLAM worker into separate workers connected by channels. It is encouraged to house and run these modules sequentially in a single worker if there are modules that must run sequentially, and the system would not benefit from delayed run-time. Modules may be placed into separate workers if it is not necessary for them run sequentially to avoid delay. Separating modules into workers allows for concurrent processing because the pipeline will naturally attempt to execute as many workers simultaneously as the hardware/software runtime supports.

In some implementations, a computer program product is tangibly embodied in an information carrier. The computer program product contains instructions that, when executed, perform one or more methods such as those described herein. The information carrier is a computer- or machine-readable medium, such as memory, expansion memory, or memory on a CPU, a GPU, a DSP, a ASIC, or similar computing hardware. Various implementations described herein may be realized in digital electronic circuitry, integrated circuitry, specially-designed ASICs (application specific integrated circuits), computer hardware, firmware, software, and/or combinations thereof. These various implementations may include implementations in collaboration with one or more computer programs which are executable and/or interpretable on a programmable system including at least one programmable processor, which may be special or general purpose, coupled to receive data and instructions from, and to transmit data and instructions to, a storage system, at least on input device, and at least one output device.

These computer programs, also known as programs, software, software applications, or code, including machine instructions for a programmable processor, may be implemented in a high-level procedural and/or object-oriented programming language and/or functional language, and/or in assembly/machine language. As used herein, the terms "machine-readable medium" and "computer-readable medium" refer to any apparatus or device, such as magnetic discs, optical disks, memory, Programmable Logic Devices ("PLDs"), used to provide machine instructions and/or data to a programmable processor, including a machine-readable signal. The term "machine-readable signal" refers to any signal used to provide machine instructions and/or data to a programmable processor.

The contents of computer-readable medium may physically reside in one or more memory devices accessible by a server. Computer-readable medium may include a database of entries corresponding to a depth frame data, image pyramid data, tracking data, IMU frame data, color frame data, RGBA data, or TSDF data. Each of the entries may include, but are not limited to, a plurality of data comprising the 3D scan of target subject 103, metadata relating to those data, GPS information, and the like.

To allow user interaction, the techniques described herein may be implemented on a computer with a display such as an LCD (liquid crystal display) or LED (light emitting diode) monitor, for displaying information to user 101 and a means by which user 101 may provide input to the compute device. Feedback provided to user 101 may be in any form of sensory feedback, such as visual feedback, auditory feedback or tactile feedback. User input may be accomplished via any form, including acoustic, speech or tactile input.

The techniques described herein may be implemented on a system which includes a back-end component, such as a data server, or which includes a middleware component, such as an application server, or which includes a front-end component, such as a client computer with a graphical user interface or Internet browser through which a user may interact with an implementation of the techniques described herein, or any combination of such components. The system components may be interconnected via any form of digital communication medium known in the art.

FIG. 1 shows an example of one embodiment of the system and method disclosed herein during use. Scanning process 100 may include one or multiple portable computing devices 102. Such devices may include, for instance, an off-the-shelf smartphone, a personal digital assistant ("PDA"), a tablet computer, a camera, or another type of portable computing device which includes a depth sensor, RGB camera, and ubiquitous processing capabilities well-known in the art for such devices. Depth sensors are well known in the art and typically employ ToF technology, structured light, programmable light or stereoscopic vision to measure distance from portable computing device 102 to a multitude of points on target subject 103. In one embodiment, the depth sensor may be integrated into portable computing device 102, and in another embodiment, it may be removably attached to portable computing device 102. Likewise, RGB cameras are quite common and typically integrated into most all portable computing devices.

Also shown in FIG. 1 is user 101 holding portable computing device 102 and scanning target subject 103 with portable computing device 102. Although FIG. 1 shows example components used in scanning process 100, in other embodiments, scanning process 100 may contain fewer components, different components, differently arranged components, and/or additional components than those depicted in FIG. 1. Alternatively, or additionally, one or more components used in scanning process 100 may perform one or more tasks described herein.

Figure 2:
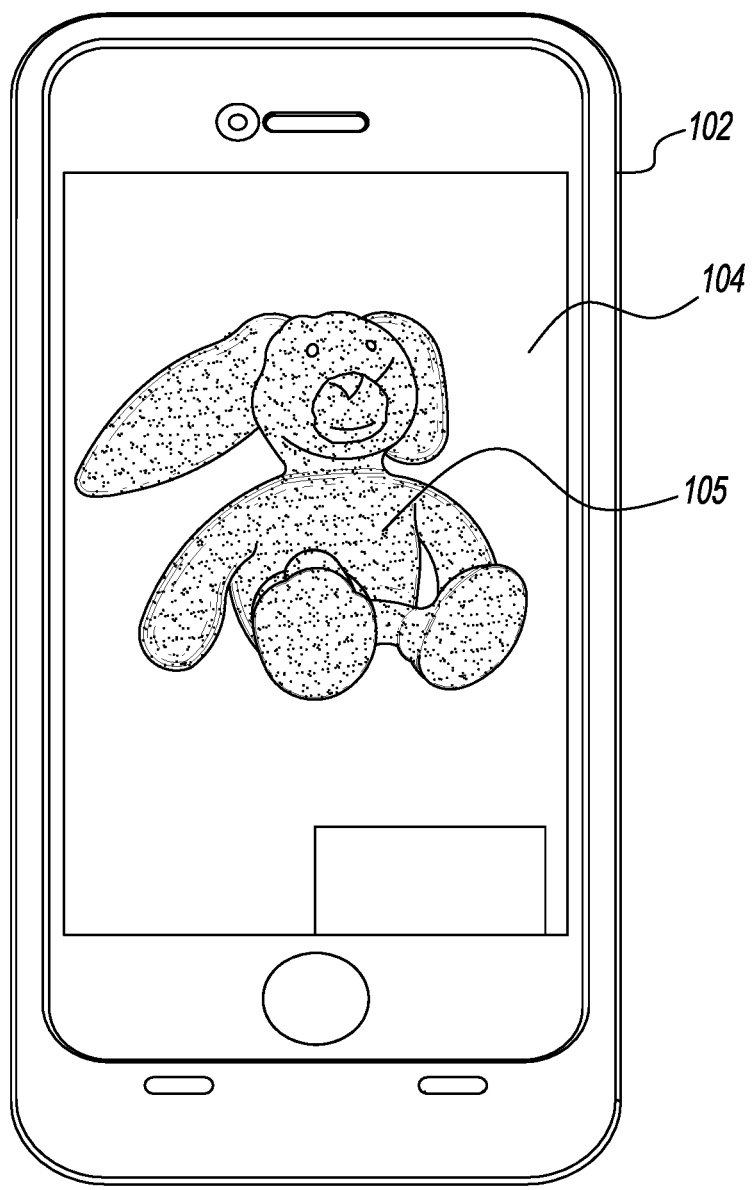
FIG. 2 illustrates a rendering of a 3D model of the target object on the portable computing device screen.

FIG. 2 shows a close-up of portable computing device 102, with interactive screen 104, which may be, for example, a TFT LCD (thin-film-transistor liquid crystal display) or an OLED (organic light emitting diode) display or other appropriate display technology which facilitates user interaction via "touch screen." In one embodiment, portable computing device 102 is a standard, off-the-shelf smartphone which is publicly available and ubiquitous in society. Portable computing device 102 comprises typical portable computing hardware and software, one or more central processing units ("CPU"), one or more graphics processing units ("GPU"), memory which may include read only memory ("ROM"), random access memory ("RAM"), one or more storage devices, one or more input devices, one or more output devices, one or more antennae, wireless networking capability, one or more cameras, one or more depth sensors, software components, interactive screen 104, and other components which allow for standard operation of portable computing device 102. It should be understood that the foregoing list is not exhaustive, but rather intended to disclose a general off-the-shelf portable computing device such as a smartphone as described in one embodiment, including its standard components necessary for general operation. A 3D model 105 of target subject 103 is displayed on interactive screen 104, which embodies an example of the output of the system and method disclosed herein.

Figure 3:
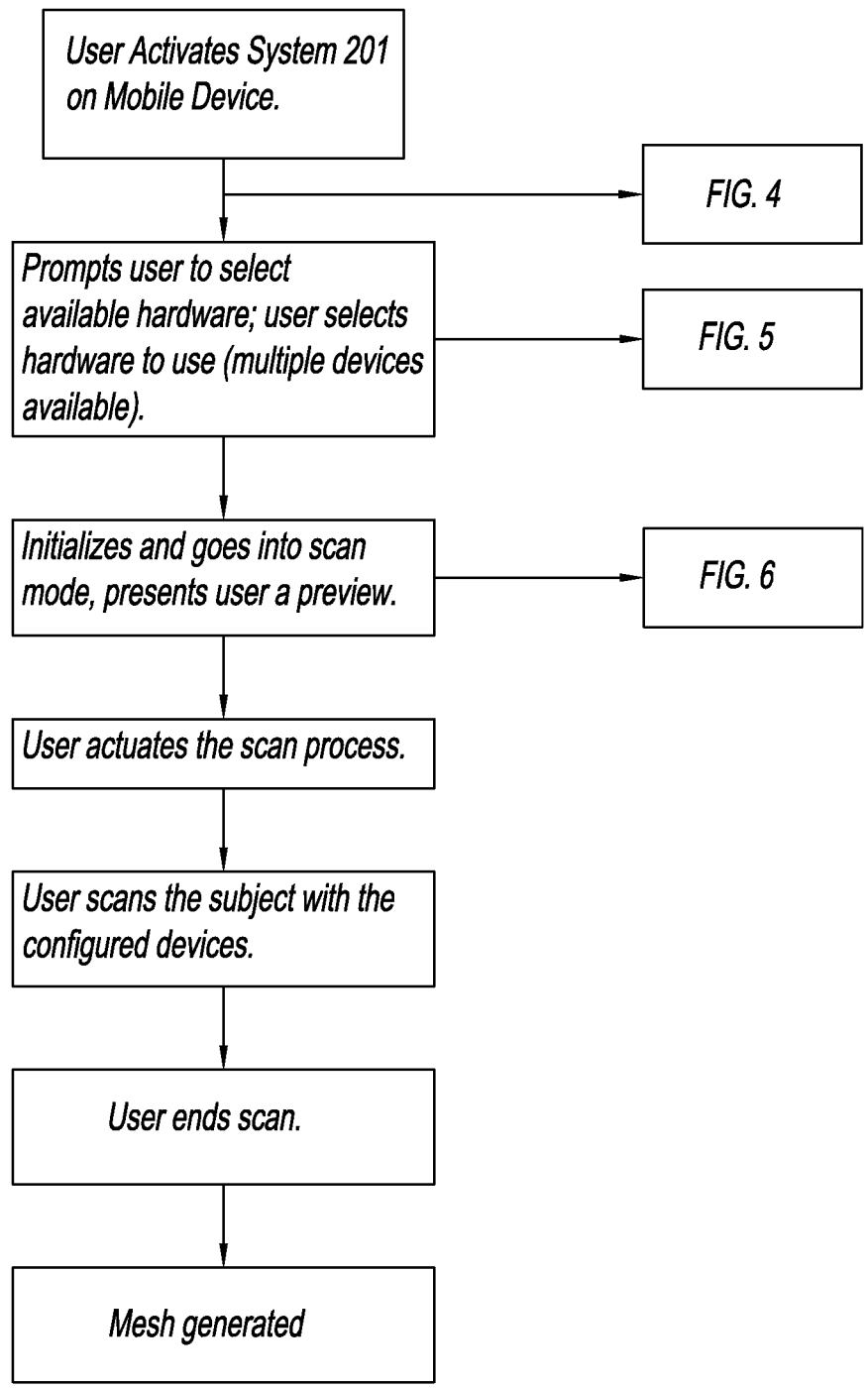
FIG. 3 is a simplified block diagram illustrating the general operation of an implementation of a 3D scanning software using the described system and method.
Figure 4:
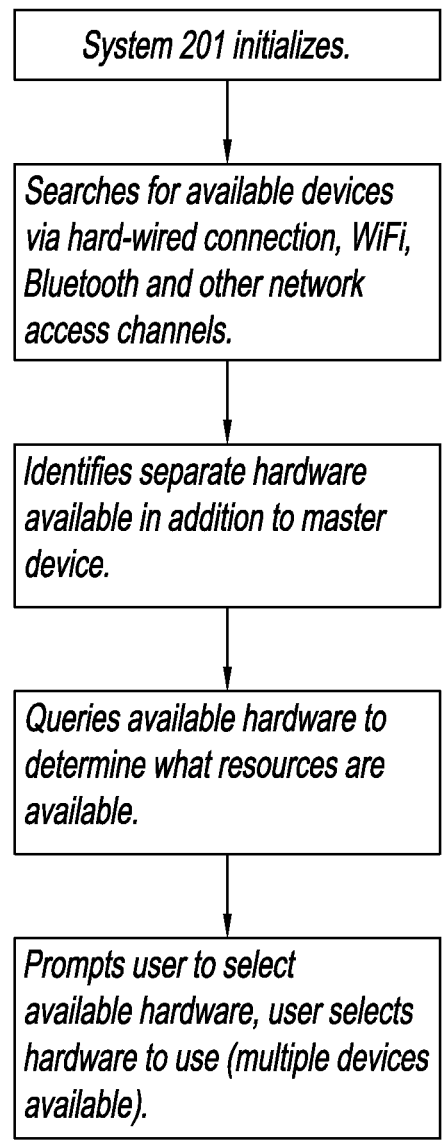
FIG. 4 illustrates the scheme by which the system and method identifies available hardware which may be shared and prompts the user to select hardware to integrate into the scan.
Figure 5:
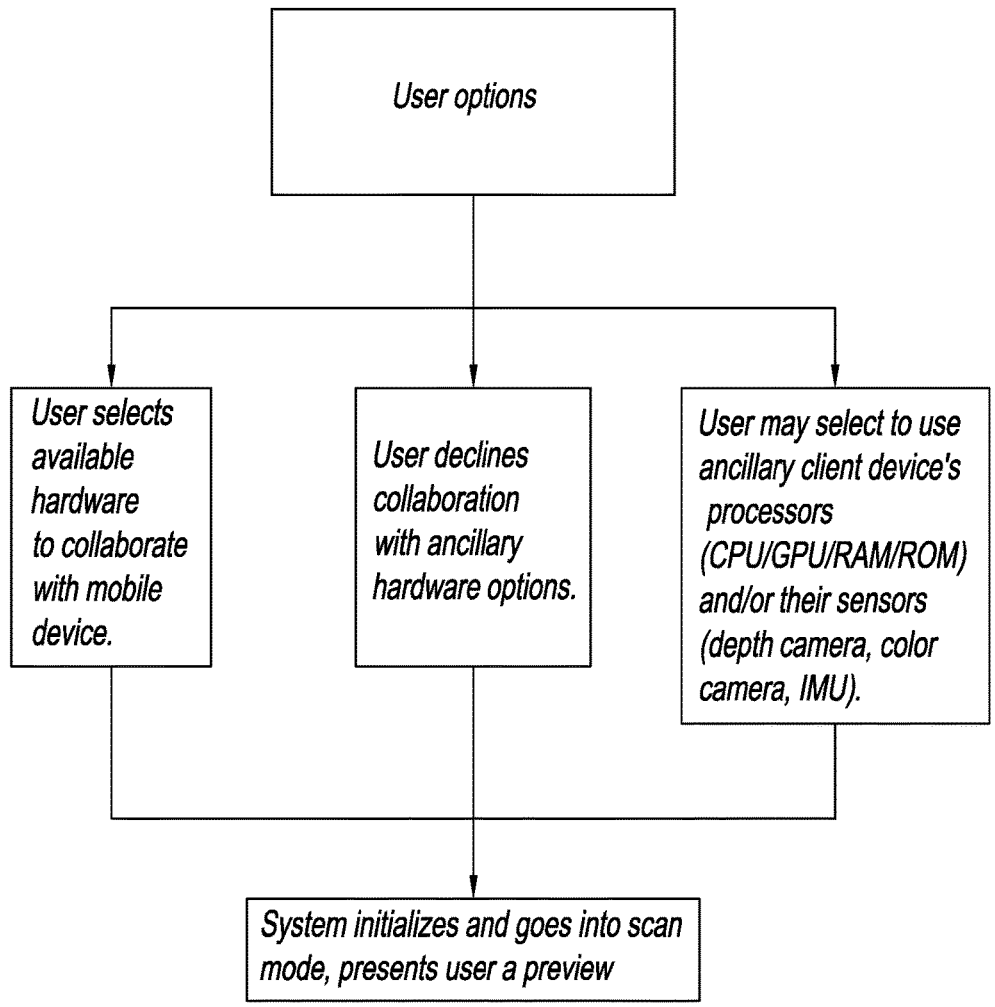
FIG. 5 illustrates the process by which the user selects from the available hardware and prompts the system and method to begin the scan and process operation.

Turning to FIG. 3, the overall process operation of a specific portable software application embodiment of the proposed system and method is described. User 101 activates system 201 by selecting an assigned application icon on interactive screen 104 (FIG. 1). Once activated, in a preferred embodiment, a fundamental simultaneous localization and mapping ("SLAM") context is initiated and system 201 begins searching for available devices with which to partner via available hard-wired connections, Wi-Fi, Bluetooth™, or other network access channels (FIG. 4). System 201 identifies separate compute devices with which it may partner portable computing device 102, and it determines which hardware computing platforms (e.g., OpenCL, CUDA, Metal, OpenVX, or RenderScript) are available for each device is running (FIG. 4). It is important to note that portable computing device 102 may run system 201 on its own without partnering with ancillary compute devices. However, it is known in the art that devices such as portable computing device 102 may partner with outside compute devices to share, transmit or communicate data and compute instructions for a multitude of operations. In the instant case, after system 201 identifies all available external hardware it may collaborate with, system 201 prompts user 101 either select the available hardware to collaborate with decline collaboration with external hardware (FIG. 3; FIG. 4; FIG. 5). In a preferred embodiment, user 101's general options are illustrated in FIG. 5. When user 101 makes his or her selection, then system 201 initializes and goes into scan mode (FIG. 3; FIG. 5).

The concept of a SLAM construct is well-known in the art and has been used in a multitude of applications related to 3D model reconstruction. Several of the more well-known SLAM implementations include Kinect Fusion by Microsoft, an open source implementation of Kinect Fusion known as Kinfu, Tango by Google, LSD-SLAM, ORB-SLAM, Point-Based Fusion. The subject invention is intended to improve the efficiency and compatibility of such SLAM implementations on a multitude of computing devices, thereby allowing them to run on processor- and memory-limited devices such as ubiquitous smartphones.

Once potential partner compute device(s), if any, are identified and selected by user 101, system 201 will query the available device(s) to determine what resources such available devices may allocate for the operation. (FIG. 4). System 201 will then query each potential partner compute device as to whether it will partner with system 201. (FIG. 4). Each potential partner compute device may elect to engage or decline the invitation system 201 extends. (FIG. 4). Such communication between compute devices may be accomplished through a multitude of optional networking communications which are well-known in the industry. One example may include a standard Internet Protocol ("IP"), which may include either Transmission Control Protocol ("TCP") or User Datagram Protocol ("UDP"). Portable computing device 102 may communicate wirelessly through any communication interface means which are well-known in the art. Various modes or protocols may be used, such as GSM voice calls, SMS, EMS or MMS messaging, CDMA, TDMA, PDC, WCDMA, CDMA2000, or GPRS, among others.

If system 201 successfully queries one or more potential partner compute devices, and one or more of said devices accepts the invitation, then system 201 prompts user 101 to select which device(s) to engage, if any (FIG. 3; FIG. 5). In accordance with one embodiment, user 101 may select to partner with one or more devices (FIG. 3; FIG. 5). If user 101 elects to partner, system 201 queries the available devices' system libraries and then it establishes ring buffers for the specific hardware available. Generation of template parameters for buffers for the partnering hardware based on that hardware's system libraries is well-known in the art.

In accordance with another embodiment, user 101 may decline collaboration with all potential partner devices (FIG. 5). In accordance with another embodiment, user 101 may elect to collaborate with one or more partner devices' processors such as CPU, GPU, memory such as RAM or ROM, and/or sensors such as depth camera, color camera and/or IMU (FIG. 5). Such collaboration and resource sharing between compute devices may be accomplished through a multitude of optional networking communications which are well-known in the industry as discussed above. Once user 101 partners with an ancillary device or devices, or elects to proceed solo, system 201 then initializes scan mode (FIG. 3).

After the devices are partnered, system 201 then establishes a series of workers and channels attached to a pipeline which includes various compute modules and ring buffers. The pipeline will choose which workers, modules, channels, and ring buffers to use when running based on the specific architecture of the hardware in use, and whether there is a sole master portable computing device or multiple partner devices.

Figure 7:
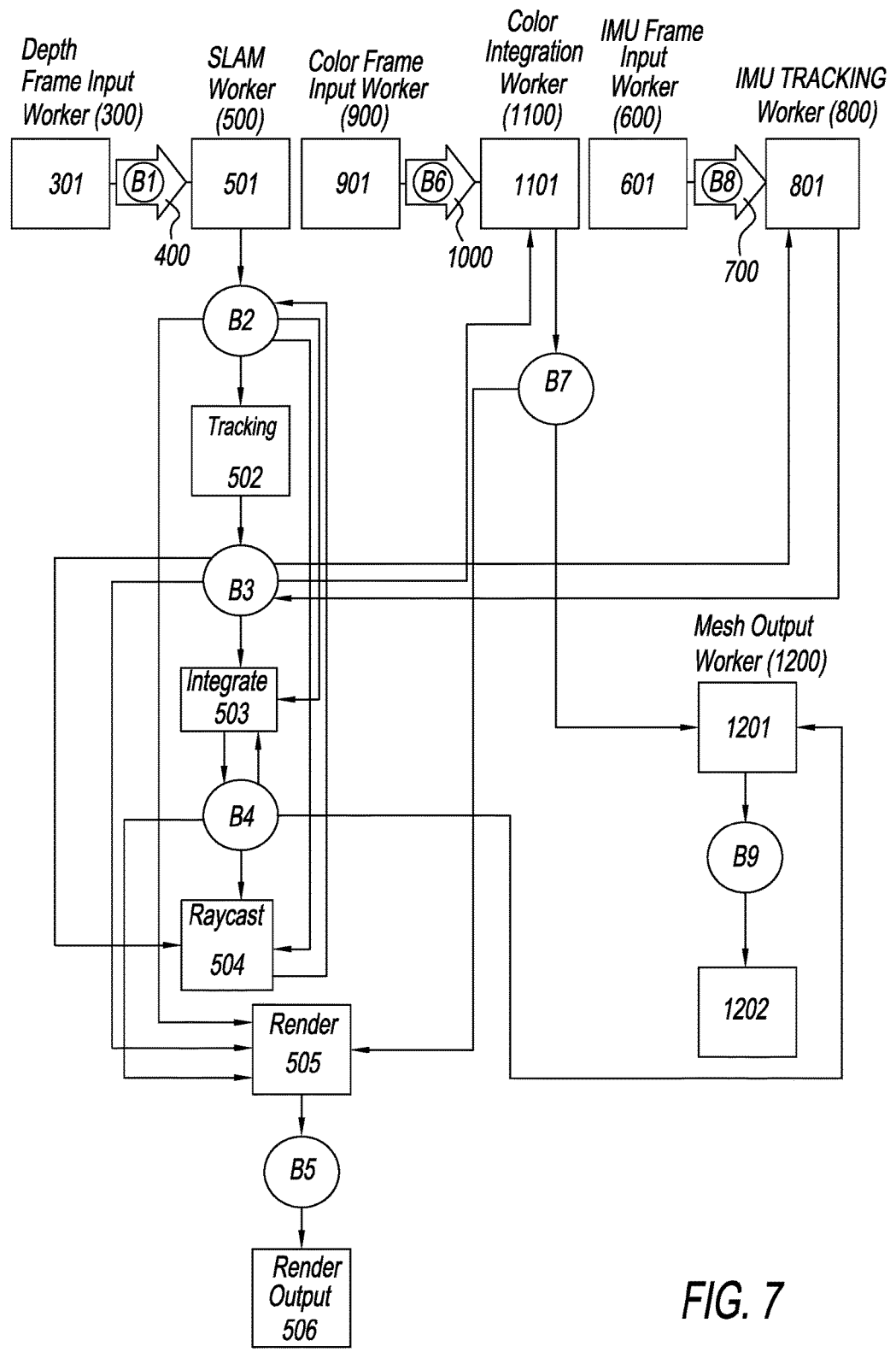
FIG. 7 is an architecture diagram of a software system and method implementation designed to create a 3D mesh by capturing three (3) sources of incoming data, processing, and rendering the result to the display screen in real-time and/or save the mesh to a data file.

A preferred embodiment of a pipeline and its components—workers, modules, ring buffers and channels—is broken down in FIG. 6 and illustrated in FIG. 7. The preferred embodiment pipeline comprises seven workers, each of which includes one or more modules which are connected to one or more ring buffers. Each of the three input workers—depth frame input worker 300, color frame input worker 900, and IMU frame input worker 600 is connected to a subsequent processing worker vis-à-vis a channel (depth frame input channel 400, IMU frame channel 700 or color frame input channel 1000). Each of the input workers acquires data from portable computing device 102, processes it, and enqueues it to the corresponding ring buffer in the connected channel. For example, as reflected in FIG. 6, Depth frame input worker 300 acquires depth data from portable computing device 102 and processes depth data in depth frame input module 301 into a format consistent with the depth frame data specified in the depth frame input channel 400. Depth frame input module 301 then enqueues the processed data to depth map ring buffer B1 which is within depth frame input channel 400. Depth frame input channel 400 then broadcasts a notify event, which SLAM worker 500 receives and may then dequeue data from depth map ring buffer B1 and begin processing it through the SLAM protocol when it is ready.

Turning to FIG. 7, a preferred embodiment of the pipeline architecture of system 201 is illustrated. When user 101 starts the scan, system 201 initializes the available image capture hardware, which in one embodiment may comprise a depth sensor, RGB camera, and an IMU input, on portable computing device 102. Portable computing device 102 starts the pipeline which begins capturing and recording data into channels. The following workers and channels are initialized: depth frame input worker 300, depth frame input channel 400, SLAM worker 500, IMU frame input worker 600, IMU frame input channel 700, IMU tracking worker 800, color frame input worker 900, color frame input channel 1000, color integration worker 1100, and mesh output worker 1200.

Depth frame input worker 300 comprises depth frame input module 301, which is connected to depth frame input channel 400. Depth frame input worker 300 acquires data from any of a multitude of depth sensors attached to portable computing device 102. Portable computing device 102 may employ a ToF sensor, structured light sensor, programmable light sensor or a stereoscopic vision sensor to resolve the distance between the sensor and the target subject 103 and portable computing device 102. Such depth frame input means are well-known in the art and provided by various depth sensor hardware manufacturers and portable device manufacturers. When depth frame input worker 300 activates, depth frame input channel 400 activates a mutual exclusion object ("mutex") to prevent other threads from accessing it while it copies the contents of the depth image. Depth frame input worker 300 activates depth frame input module 301 and writes the acquired data to depth map ring buffer B1 which is within depth frame input channel 400. This process is known as "enqueuing." Depth frame input channel 400 then unlocks the mutex to allow other threads to dequeue depth image data from depth map ring buffer B1. Depth frame input channel 400 broadcasts a notify event which alerts listening workers that the data for that depth frame has been written to the ring buffer.

SLAM worker 500 comprises image processing module 501, image pyramid ring buffer B2, tracking module 502, tracking store ring buffer B3, integrate module 503, TSDF volume ring buffer B4, raycast module 504, render module 505, RGBA preview image ring buffer B5, and render output module 506. Upon receipt of the notify event from depth frame input channel 400, SLAM Worker 500 may dequeue data from depth frame input channel ring buffer B1 into image processing module 501. Image processing module 501 may then configure the depth image data and process the data into an image pyramid. During processing, the data is subjected to repeated smoothing and subsampling and arranged into an image pyramid. An "image pyramid" is well-known in the art and generally defined as a multi-scale signal representation of an image which may be subject to repeated smoothing and subsampling. Commonly-known examples may include a Gaussian pyramid, Laplacian pyramid, Steerable pyramid, surface normal pyramids and vertex pyramids. In this preferred embodiment, the surface normal pyramid represents the surface normals of the depth images from the various levels of the image pyramid. The vertex pyramid represents the vertices of the depth images from the various levels of the image pyramid. Collectively these various levels of the pyramids are known as input vertices and normals.

Image processing module 501 then enqueues the image pyramid data to image pyramid ring buffer B2, where it is stored in a data structure. User 101 may instruct system 201 to display the graphic representation of the image pyramid on interactive screen 104 by selecting the appropriate option on interactive screen 104. When so prompted, image pyramid ring buffer B2 will display the image pyramid on interactive screen 104.

Tracking module 502 may dequeue data from image pyramid ring buffer B2 and apply an iterative closest point ("ICP") algorithm. The ICP algorithm finds the transformation between the input vertices and normals and the ray casted vertices and normals to identify the location of portable communication device 102 relative to the target subject. Tracking module 502 generates a camera pose estimation, which is generally known in the art. Tracking module 502 enqueues the pose estimation to tracking store ring buffer B3.

IMU frame input worker 600 may initiate when the SLAM operation begins, and may run simultaneously with depth frame input worker 300. IMU frame input worker 600 comprises IMU frame module 601, which is connected to IMU input channel 700. IMU frame input worker 600 may record gyroscope, accelerometer and orientation data from portable computing device 102, may coordinate a time stamp with the IMU data, may process the data in IMU frame module 601 and may enqueue the time-stamped IMU data to IMU ring buffer B8 within IMU input frame input channel 700. IMU input channel 700 then broadcasts a notify event, which IMU tracking worker 800 may receive. Upon receive a notify event, IMU tracking module 801 within IMU tracking worker 800 may then dequeue data from IMU input channel ring buffer B8. IMU tracking module 801 may employ a linear quadratic estimate to track the movement and estimate the position and orientation of portable computing device 102 in 3D space. IMU tracking module 801 dequeues pose estimate data from track store ring buffer B3 and combines this pose with the estimate of position and orientation from the IMU. This process is commonly known as Kalman filtering and is ubiquitous with 3D tracking applications. IMU tracking module 801 then enqueues the updated pose estimate from the Kalman filtering to tracking store ring buffer B3.

Integrate module 503 may dequeue the pose estimate data from ring buffer B3. Integrate module 503 may also dequeue image pyramid data from image pyramid ring buffer B2. Integrate module then calculates based on the pose estimate and the input vertices from the image pyramid where the surface of model is in world space. The process of creating a truncated signed distance function (TSDF) through integration of a depth map or vertices is well known in the art. Integrate module 503 may then enqueue the updated TSDF volume data back to ring buffer B4. During the first iteration or pass, TSDF volume ring buffer B4 may be empty or set to a zero TSDF, in which case the first data integrate module 503 enqueues to ring buffer B4 will comprise the initial TSDF volume. Integrate module 503 may then dequeue TSDF volumetric surface representation data from TSDF volume ring buffer B4 as integration proceeds.

Ray cast module 504 may create a point cloud with data it may dequeue from image pyramid ring buffer B2, tracking store ring buffer B3, and TSDF volume ring buffer B4. Ray cast module 504 creates an array of vertices and normals that represent the TSDF Volume as it was seen from pose data dequeued from tracking store ring buffer B3. Ray cast module 504 may enqueue the ray casted vertices and normals data into the image pyramid ring buffer B2. This process of ray casting, which is well known to those skilled in the art, effectually updates the image pyramid with data that was processed through tracking module 502, IMU tracking module 801 and integrate module 503. As with the other modules, ray cast module 504 may dequeue data from the ring buffers when it is scheduled to do so based on the configuration of the pipeline. As a result, the system does not crash due to processor overload, memory issues, mis-configured buffers, deadlock or timeouts.

Color frame input worker 900 may initiate when the SLAM operation begins, and may run simultaneously with the other workers. A color camera sensor, such as a standard digital camera integrated with portable computing device 102, may be activated and begin recording and time-stamping color image data frames corresponding to the depth frames and IMU frames. Color frame input worker 900 activates color frame module 901 which acquires and enqueues color frame data to color image ring buffer B6 within color input channel 1000. Color input channel 1000 may issue a notify event after the data is enqueued.

Color integration worker 1100 comprises in part integrate color module 1101, which dequeues color frame data from color image ring buffer B6 after receipt of the notify event from color input channel 1000. Integrate color module 1101 may also dequeue pose estimate data from tracking store ring buffer B3. Integrate color module 1101 may then integrate the time-stamped color frame in coordination with the time-stamped pose estimate. The process for integrating color into a color TSDF volume is substantially similar to that of integrating vertices into a TSDF volume and is well known in the art. Integrate color module 1101 may then enqueue the integrated color TSDF volume data to color TSDF ring buffer B7.

Render module 505 may dequeue data from image pyramid ring buffer B2, tracking store ring buffer B3, TSDF volume ring buffer B4, and/or color TSDF ring buffer B7. This dequeueing of data is run sequentially in this embodiment, but in another embodiment, it may be triggered by a notify event from a channel. Upon receipt of the requisite data from any combination of the ring buffers, render module 505 integrates the data it receives, collates the data in accordance with corresponding time stamps, and composes a 2D preview image of a 3D model of the target subject 103 from a specific position of portable computing device 102 at a given time. Render module 505 may enqueue the 2D preview image of the 3D model to RGBA preview image ring buffer B5. User 101 may instruct system 201 to display the graphic representation of the preview of the 3D mesh on interactive screen 104 by selecting the appropriate option on interactive screen 104. When so prompted, RGBA preview image ring buffer B5 will display the preview of the 3D model on interactive screen 104 vis-à-vis render output module 506.

Render output module 506 may dequeue data from RGBA preview image ring buffer B5. Render output module 506 is run sequentially in this embodiment, but in another embodiment, it may be triggered by a notify event from a channel. Render output module 506 may be any standard means of displaying a color image on a device, for example OpenGL. The process of displaying an RGBA preview image from a ring buffer is well known in the art.

Mesh output worker 1200 comprises in part mesh module 1201, which may dequeue data from TSDF volume ring buffer B4 and RGBA TSDF ring buffer B7. In a preferred embodiment, when the user ends scan on portable compute device 102 (FIG. 3), mesh output worker 1200 dequeues the requisite data from ring buffers B4 and B7 and upon receipt, mesh module 1201 converts the TSDF Volume representation of target subject 103 into a 3D mesh. In another embodiment, mesh output worker 1200 may also be initialized upon receipt of a notify event from one of the channels within system 201.

A "mesh" is well-known in the art and is generally known to be a collection of vertices, angles, and faces which define the shape of a target object in 3D computer modeling. The faces typically comprise triangles, quadrilaterals or other polygons. The process of converting a TSDF volume into a 3D mesh is well known in the art, and can be accomplished through a variety of algorithms One common algorithm for achieving this is the "marching cubes algorithm", which is a high-resolution 3D surface construction algorithm.

The output of mesh module 1201 is then enqueued into mesh ring buffer B9. Save mesh module 1202 may dequeue the contents of mesh ring buffer B9 and save the mesh to a file in various formats, including but not limited to OBJ, STL, VRML, or PLY. The process of saving polygonal mesh data from memory to a file on disk is well known in the state of the art. These file(s) may be opened with other 3D computer graphics programs and software, examples include Blender, Meshlab, NetFabb, Autodesk, and Sketchup (registered trademarks), which are known in the art.

It is intended that system 201 run continuously and produce 3D meshes which may be continuously smoothed and refined as more data is acquired. It is advisable for user 101 to move portable computing device 102 around target subject 103 to obtain data from as many angles as possible, as continuous data acquisition and processing will enhance the accuracy and detail of 3D model 105.

The operations disclosed herein may be written in a computer-readable medium, such as memory, which is well-known in the art. A computer-readable medium may be defined as one or more physical or logical memory devices and/or carrier waves. Implementations consistent with the principles of this invention are not limited to any specific combination of hardware circuitry and software. Any software-related instructions, algorithms, commands, prompts, messages and communications may interface on all open-source software platforms, thereby rendering the system and method disclosed herein device- and software-agnostic.

The invention claimed is:

1. A system comprising:
a hand-held portable computing device which houses a first set of image capture hardware comprising a depth sensor, a red-green-blue ("RGB") image sensor, and an inertial measurement unit ("IMU"),
said hand-held portable computing device also housing computing workers which operate said image capture hardware to scan a three-dimensional ("3D") object, capture multiple, consecutive color images of the 3D object, and generate time-stamped depth frame data, color frame data, and inertial measurement data for each image; and
a set of template-driven processing pipelines configured to generate a 3D progressive rendering of the 3D object in real-time by processing the depth frame data, color frame data, and inertial measurement data using multiple, separate thread-safe processor modules and circular buffer data structure system channels; and
said set of template-driven processing pipelines also configured to allow the system to operate on multiple standard consumer hand-held portable computing device operating software platforms; and memory configured to save the 3D progressive rendering in various file formats.

2. The system of claim 1, wherein the hand-held portable computing device is a smartphone device.

3. The system of claim 2, further comprising a computing worker to identify a second computing device and communicate the depth frame data, color frame data, and inertial measurement data between the hand-held portable computing device and the second computing device.

4. The system of claim 3, further comprising a computing worker to identify computing hardware capacity available on the second computing device and allocate one or multiple processing tasks to the second computing device.

5. The system of claim 4, further comprising a computing worker to communicate the 3D progressive rendering to a third computing device.

6. A method comprising:

scanning the 3D object on a hand-held portable computing device; and acquiring time-stamped depth data, color data, and inertial measurement data associated with said 3D object scan on the hand-held portable computing device; and generating a real-time progressive 3D mesh-based object on the hand-held portable computing device using a set of template-driven processing pipelines comprising multiple, separate processor computing workers and circular buffer data structure thread-safe system channels; and enqueuing data from each computing worker to a circular ring buffer data structure, the data to be subsequently dequeued by a separate computing worker, and then processed by said separate computing worker, and then enqueued to circular ring buffer data structure.

7. The method of claim 6, further comprising rendering a progressive 3D polygon mesh-based model.

8. The method of claim 7, further comprising displaying a rendered 3D polygon mesh-based model on the portable computing device in real-time.

9. The method of claim 8, further comprising saving the 3D polygon mesh-based model to a memory located on the portable computing device in multiple different digital file formats.

10. The method of claim 9, further comprising communicating the 3D polygon mesh-based model to a third computing device.

11. The method of claim 10, wherein the portable computing device is a smartphone device.

12. The method of claim 11, further comprising communicating the depth data, color data, or inertial measurement data from the portable computing device to a second computing device.

13. The method of claim 12, further comprising identifying computing hardware capacity available on the second computing device, and allocating a processing task to the second computing device.

14. A non-transitory processor-readable medium storing code representing instructions to be executed by computing processors housed within a hand-held portable computing device which causes the processor to:

scan a 3D object;

acquire depth data, color frame data, and inertial measurement data with respect to the 3D object;

generate a progressive, real-time 3D mesh-based model of the 3D object with a computing processor using the depth data, color frame data, and inertial measurement data, and using code to enqueue data from processor computing workers to a circular ring buffer data structure, and using code to dequeue data from the circular ring buffer data structure by processor computing workers;

save a 3D mesh-based model of the 3D object to a digital file;

communicate the digital file to a second computing device; and display the progressive 3D mesh-based model on the computing device.

15. The non-transitory processor-readable medium of claim 14, the processor-readable instructions comprising code to prompt the first computing device to communicate with a second portable computing device to identify computing hardware capacity available on the second portable computing device, and allocate a processing task to the second portable computing device.

16. The non-transitory computer readable medium of claim 15, the processor-readable instructions comprising code to interface with multiple computing software platforms.

* * * * *